May 19, 1959  L. H. MORIN  2,887,282
PLASTIC SPOOL WITH LIGHTENED RIMS
Filed Jan. 10, 1955  3 Sheets-Sheet 2

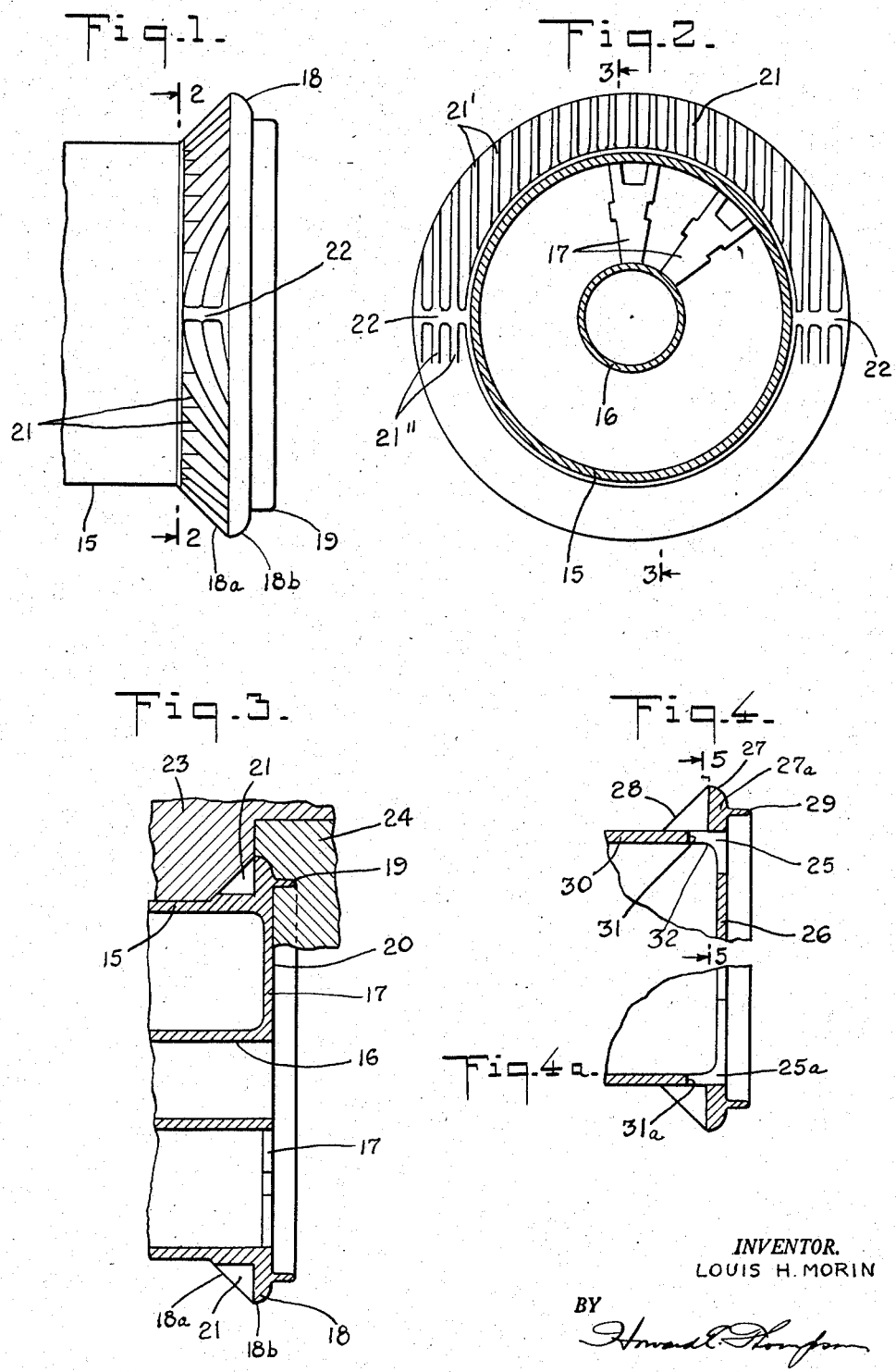

INVENTOR.
LOUIS H. MORIN
BY
ATTORNEY.

May 19, 1959 L. H. MORIN 2,887,282
PLASTIC SPOOL WITH LIGHTENED RIMS
Filed Jan. 10, 1955 3 Sheets-Sheet 3
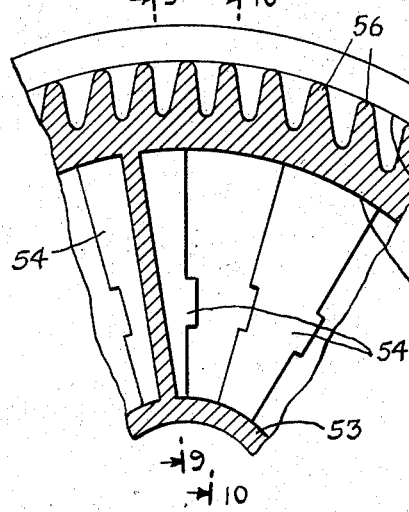
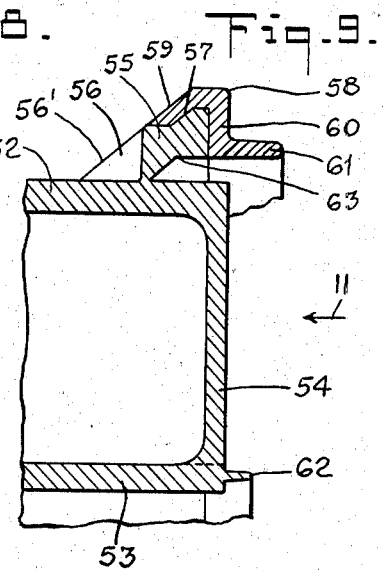
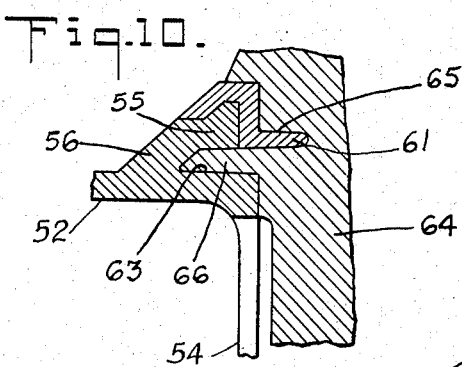
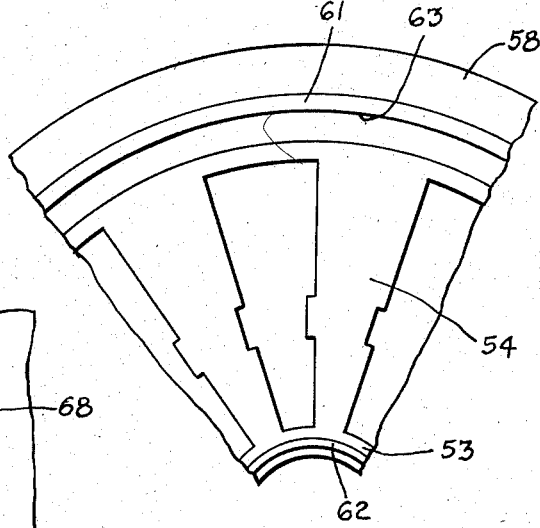
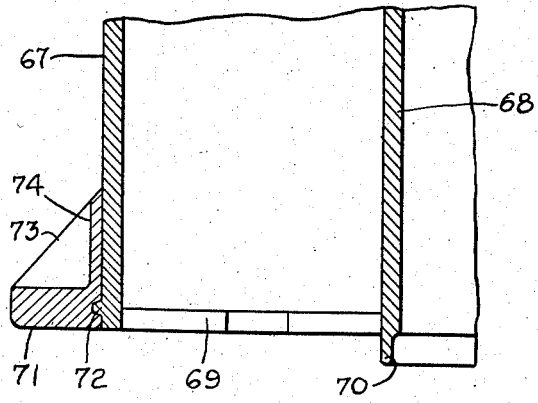
INVENTOR.
LOUIS H. MORIN
BY
ATTORNEY.

United States Patent Office 2,887,282
Patented May 19, 1959

2,887,282

PLASTIC SPOOL WITH LIGHTENED RIMS

Louis H. Morin, Bronx, N.Y., assignor to Coats & Clark Inc., New York, N.Y., a corporation of Delaware Application January 10, 1955, Serial No. 480,898

16 Claims. (Cl. 242—118.7)

This invention relates to the production of plastic spools. More particularly, the invention deals with the formation of spools in such a manner as to materially reduce the weight of the rim portions of the spools without interfering with the strength and rigidity thereof, thereby effecting a substantial reduction in the overall weight of the spool and saving in the amount of material employed.

Still more particularly, the invention deals with a spool structure, wherein the means for lightening the spool rims is accomplished through the medium of dies employed, rather than through the medium of special coring.

The novel features of the invention will be best understood from the following description, when taken together with the accompanying drawing, in which certain embodiments of the invention are disclosed and, in which, the separate parts are designated by suitable reference characters in each of the views and, in which, Fig. 1 is a side view of one end portion of a spool made according to my invention, diagrammatically illustrating the arrangement of the lightened rim.

Fig. 2 is a partial section on the line 2—2 of Fig. 1, also indicating only part of the background showing.

Fig. 3 is a section on the line 3—3 of Fig. 2, diagrammatically illustrating parts of the dies for forming the rim portion of the spool.

Figs. 4 and 4a show broken sectional views through rim portions of a modified form of spool, the sections being taken through the lines X—X and Y—Y of the spool structure shown, in part, in Fig. 5 of the drawing.

Fig. 8 is a view, generally similar to Fig. 2, on an enlarged scale, showing part of the construction and showing a modification.

Fig. 9 is a partial section on the line 9—9 of Fig. 8.

Fig. 10 is a partial section on the line 10—10 of Fig. 8.

Fig. 11 is a partial end view looking in the direction of the arrow 11 of Fig. 9; and Fig. 12 is a view, generally similar to Fig. 9, taken through a different section of the spool body and showing a modification.

Figure 5:
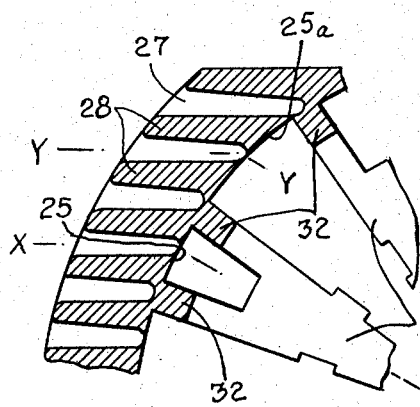
Fig. 5 is an enlarged detailed sectional view of the spool structure, otherwise indicated in section in Fig. 4 of the drawing, along line 5—5 of Fig. 4.

In the moulding of plastic spools such as are disclosed, for example, in copending applications Serial Numbers 363,294, 363,295, now Patent No. 2,750,129, 363,281, and 363,363, each filed on June 22, 1953, the rim end portions or flanges of the spools have usually been formed with a cross section that is solid throughout the circular length of the flange, that is, each flange or rim end portion is solid. In some spools disclosed in said copending applications, spaced openings have been formed in each face of the spool adjacent the outer periphery of the end face, but these openings have necessitated the use of delicate auxiliary cores on the core units used for making the spools, thus rendering the core units more difficult to make and to maintain; furthermore, the openings are visible, an arrangement which may not always be wanted. Also, in copending application Serial Number 408,377, filed February 5, 1954, the bevel or bevelled portions of the flanges have, in part, been formed with slots or recesses using specially designed core units, but it may be noted in this connection that for some spools, such as those having an annular flange extending from each end face as disclosed in copending applications Serial Numbers 442,137, 442,138, and 442,140, each filed July 8, 1954, it may not be feasible to employ core units to form recesses in the bevel of the flanges.

According to the present invention, recesses or slots are formed in the bevel of the rim end portions or flanges of a spool by means of the dies for forming the spools rather than by use of special core units. These slots or recesses are formed to a greater extent than heretofore, affording substantial weight reduction in the spools and economy of material while at the same time leaving the spools well able to resist torsion, to which they may be subjected, for example, during the spooling operation. This ability to resist torsion is due to, among other things, the provision of a large number of ribs in the flanges, as will be described. As indicated, the invention is particularly applicable to spools having annular flanges extending from their end faces, but it is not limited to such spools, being suitable for spools in general that have rims or flanges whose bevel or bevelled portion is capable of being recessed or cored out by means of the dies employed to form the flanges.

Referring to Figs. 1–3, the moulded plastic spool shown there has a barrel or cylindrical portion 15 and a tubular core 16 which joins the cylindrical portion 15 at end portions of the spool through circumferentially spaced end wall portions or radial ribs 17, which can be of the structure shown in part in Fig. 2. Only a skeleton showing of the spool end is indicated in Fig. 2 in order to simplify the showing. The inner tube 16 and outer tube 15 may also be connected to each other through several spaced longitudinal reinforcing ribs, not shown, of the kind illustrated at 50 in the modification of Fig. 7.

At 18 is indicated the rim portion or flange at one end of the spool body and, as both ends of the spool body have similar rims, only one rim is shown. Rim portion or flange 18 comprises an inner annular bevel or bevelled portion 18a, an outer annular portion 18b, and an annular flange 19 extending outwardly from the latter. Flange 19 can be bent or spun-over to retain a label upon the outer surface or end face 20 of the spool in accordance with the procedure set forth in said copending applications Serial Numbers 442,137 and 442,138, and in copending application Serial Number 483,046, filed January 20, 1955.

The inner bevelled portion 18a has a plurality of circumferentially spaced ribs 21 which are triangular in shape when viewed in side elevation as in Fig. 3. The ribs at one side of the spool or, in other words, at the upper side of the radially extending ribs 22, for example, the ribs indicated as 21' at the upper portion of Fig. 2, are all parallel to each other and extend substantially at right angles to the ribs 22; corresponding ribs at the other side of the spool, part only of which are indicated at 21'', at the lower portion of Fig. 2 are also parallel to each other and extend substantially at right angles to the ribs 22 and are parallel to the ribs 21'. There are two ribs 22, as shown in Fig. 2, and as is evident, some of the ribs 21 merge with them. Between each pair of neighboring ribs 21 a recess or slot is formed having the same general shape as the ribs, and as noted above these recesses serve to reduce the weight of the spool and to economize plastic.

This arrangement of alternate ribs and recesses is produced by the dies or moulds, one of which is indicated in part at 23 in Fig. 3. Part of a core unit for completing the formation of the rim, and for forming the end portion of the spool, is indicated at 24 in Fig. 3. A core unit of this type is disclosed broadly in my copending application Serial No. 363,364, and more specifically in copending application Serial No. 486,664, filed February 7, 1955. It will be understood that the parting line between the dies or moulds 23 will be along the line of the opposed radial ribs 22.

In Figs. 4, 4a, and 5, I have shown a slight modification of the structure shown in Figs. 1 to 3, wherein the rim end portion 27, more particularly the outer annular portion 27a thereof, is further lightened by forming circumferentially spaced openings thereon, as indicated at 25 in the upper part of Fig. 4, and also indicated as 25a between the end ribs or end wall portions 26 of the spool, as noted in Fig. 5 of the drawing, at the inner or small diameter of the rim 27. In other words, the ribs 28 of the rim will be the same as the ribs 21 and the rim 27 will have the outwardly extending annular flange 29, similar to the flange 19 but, instead of continuously joining the rim 27 with the outer cylindrical portion 30 of the spool, spaced openings 25 and 25a are provided and these openings extend into the ends of the cylindrical portion, as noted at 31 and 31a, in Figs. 4 and 4a. Fig. 4 is taken generally along the line X—X of Fig. 5, in other words, through one of the end wall portions 26; whereas, Fig. 4a is along the line Y—Y of Fig. 5, in other words, at a point intermediate two of the portions 26. It will be noted from a consideration of Fig. 5 that the portions 26 directly join the rim 27 in solid circumferentially spaced rib wall portions 32.

Figure 6:
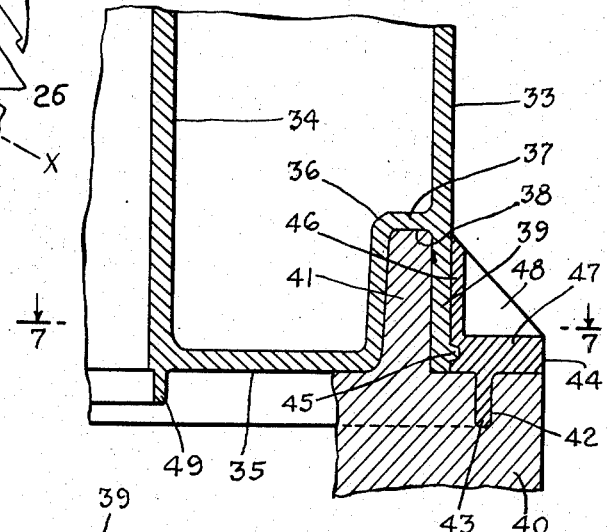
Fig. 6 is an enlarged sectional view, substantially similar to Fig. 3, showing only one corner portion of a spool and diagrammatically illustrating part of a die used in producing the same.
Figure 7:
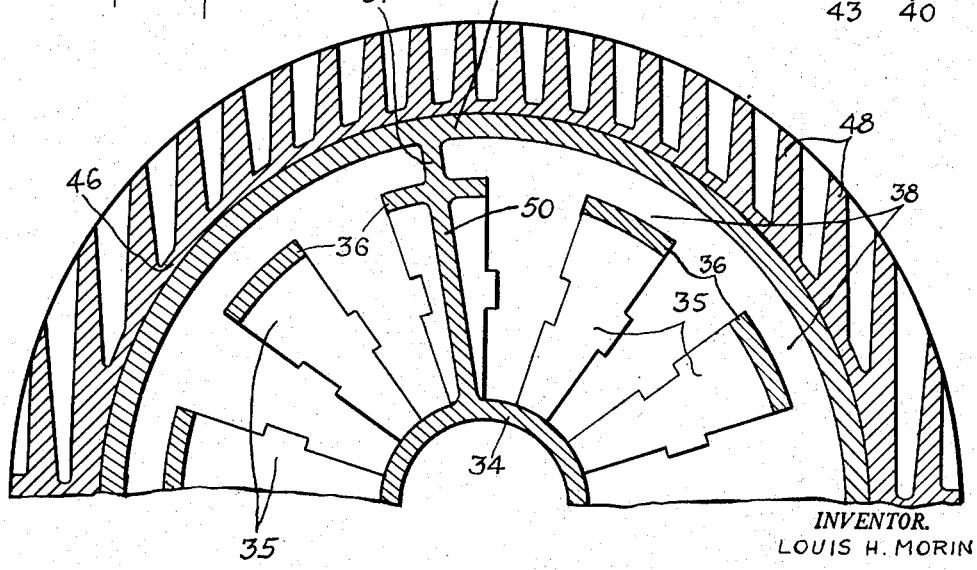
Fig. 7 is a partial section on the line 7—7 of Fig. 6 omitting the die, partially seen in Fig. 6.

In Figs. 6 and 7 is shown another modification in which 33 represents the outer cylinder of the spool, 34 the inner tube and 35 the circumferentially spaced end wall portions joining the cylinder and tube, as with the other spool structures, a primary difference in the joining of the portions 35 with the cylinder 33 being that this is accomplished by offset wall portions 36, note Fig. 6. By means of the offset portions 36 the portions 35 are extended inwardly of the cylinder 33 to the position indicated by the short radial wall 37. This produces recesses 38 between the end wall portions 35 and the annular end portion 39 of the cylinder 33 in the manner illustrated in Fig. 6. In this figure, part of a die unit is indicated at 40, the unit having inwardly extending portions 41 for forming the recesses 38. In the construction shown, the unit 40 is also provided with an annular groove 42 utilized in forming the annular flange 43 of a cast-on rim 44. In initially moulding the body of the spool, the portion 39 is fashioned with an outwardly extending key flange 45, upon which the cast-on rim 44 is then formed in a separate casting step, the key flange 45 serving to retain the cast-on rim 44 against displacement from the spool body. The cast-on rim includes an annular portion 46 which fits directly upon the end portion 39 and between portion 46 and the outer annular rim portion 47 are circumferentially spaced ribs 48, generally similar to the ribs 21, 28 of the structure shown in Figs. 1 to 5, inclusive. In other words, instead of forming the ribs directly upon an integral rim, as in Figs. 1–5, these ribs are formed on the cast-on rim. With this type of a construction, the main body portion of the spool can be composed of an inexpensive material, whereas, the cast-on rim 44 can be formed from a higher quality material. With this method of procedure, a spool body can be more economically produced. It will appear from a consideration of Fig. 6 of the drawing that another annular outwardly extending flange portion 49 is provided at the spool end in alinement with the tube 34. The latter flange can also be spun-over in securing a label upon end surfaces of the spool, together with the spinning-over of the flange 43.

At circumferentially spaced intervals, longitudinal reinforcing ribs are provided at the spool body in alinement with the end ribs 35 and one of such ribs is indicated at 50 in Fig. 7 of the drawing. Where this rib is located, the die 40 will be so constructed as to extend the rib to the annular wall 39, as seen at 51.

In Figs. 8 to 11, inclusive, I have shown another adaptation of my invention, illustrating the application of a cast-on rim portion to a partially formed rim. In said figures, 52 represents the outer cylinder portion of a spool body, 53 the inner tube, 54 the end ribs joining the cylinder and tube and at 55 is shown a partial rim portion, the inner end of the rim portion, where it joins the cylinder 52, having circumferential ribs 56, generally similar to the ribs 21 and, outwardly of the ribs, the rim portion 55 is recessed, as seen at 57, to receive a cast-on rim 58, which fills the recess 57 and has a bevelled wall portion 59 in alinement with the outer bevelled wall portions 56' of the ribs 56.

The rim 55 is further reduced on its outer surface to receive the outer annular wall portion 60 of the cast-on rim, so that this wall portion will be in alinement with the end ribs 54, as is clearly illustrated in Figs. 9 and 10 of the drawing. The cast-on rim 58 includes an annular flange 61, similar to the flange 19, of Figs. 1 to 3, inclusive. It will also appear from a consideration of Fig. 9 of the drawing that a flange 62, similar to the flange 49, is also employed at the outer end of the tube 53.

With the construction shown in Figs. 8 to 11, inclusive, the rim 55 is hollowed out by an annular groove 63. Considering Fig. 10 of the drawing, I have shown here, in part, a die 64 fashioned, as seen at 65, to form the cast-on rim and this die will include a part 66 extending into the annular recess 63 of the pre-formed spool body in support of the wall of the rim 55 in the pressure injection of the moulding material into the die 64 in forming the cast-on rim structure. At this time, it will also be pointed out that the portion 41 of the die 40 serves to support the wall 39 in the operation of forming the cast-on rim 44 in the structure shown in Figs. 6 and 7 of the drawing.

The sections of Figs. 9 and 10 differ from each other in showing the contour of the complete rim structure of the spool, as taken between the ribs 56, as in Fig. 9, and directly through one of the ribs 56, as seen in Fig. 10.

In Fig. 12 of the drawing, I have shown a slight modification of the structure shown in Figs. 6 and 7 of the drawing. In this figure, 67 represents the outer cylinder of the spool body, 68 the inner tube, 69 one of the ribs similar to the ribs 17. Here the end of the tube 68 has an outwardly projecting annular label retaining flange 70; whereas, a cast-on rim 71 is flangeless, the rim 71 being similar to the rim 44, except for the omission of the flange 42. The cast-on rim is keyed to the spool body, or the cylinder 67 thereof, by engaging an annular key flange 72. The cast-on rim 71 has circumferentially spaced ribs 73, generally similar to the ribs 48 of Figs. 6 and 7. The cast-on rim 71 includes a wall portion 74, similar to the wall 46, which is arranged inwardly upon the cylinder 67.

In all of the structures disclosed, it will appear that means is provided for materially reducing the amount of plastics employed in the rim end portions of the spools, thus materially economizing on the cost of producing the spool body.

With all of the rim structures shown, the outer extremities of the rims are circumferentially continuous and the circumferentially spaced ribs or members are arranged inwardly of said outer extremities. This construction gives strength and rigidity to the spool.

Considering, for example, Fig. 2 of the drawing and, particularly, the ribs 21', 21'', where they are united through the radial ribs 22, these ribs may be said to be joined through the medium of the radial ribs 22 at these positions of intersection.

Having fully described my invention, what I claim as new and desire to secure by Letters Patent is:

1. A moulded plastic spool, comprising a substantially hollow spool body having enlarged rim ends, each rim end having externally thereof an outer portion disposed toward said end and an inner portion disposed away from said end, said inner portion of each rim end having circumferentially spaced ribs disposed therearound, the ribs at one side of the spool body extending in an opposed direction to the ribs on the opposite side of the spool body, all of said ribs being substantially parallel to each other, and a recess between each pair of next adjacent ribs, said recesses lightening the weight of the spool and reducing the amount of plastic required to make the spool.

2. A moulded plastic spool according to claim 1 in which the ribs of said one side of the spool body are divided from the ribs at said opposite side by a pair of oppositely disposed, radially extending ribs that are substantially normal to said parallel ribs, some of said parallel ribs being integrally joined to said radially extending ribs.

3. A moulded plastic spool according to claim 1 in which each rim end has an outwardly projecting annular label retaining flange.

4. A moulded plastic spool according to claim 3 in which each rim end, radially inwardly of said label retaining flange, has a group of circumferentially spaced recesses that open outwardly through said end of said rim.

5. A moulded plastic spool according to claim 1 in which said rim ends are bevelled, a supplemental rim mounted on said rim end and keyed thereto, and said supplemental rim having a bevelled surface in alinement with the bevelled surface of said ribs.

6. A moulded plastic spool according to claim 1 in which said rim ends constitute independent parts mounted upon the spool body, said spool body being of lower quality less expensive plastic than said rim ends, and interengaging means on the spool body and rim ends for keying said rim ends against displacement from the spool body.

7. A moulded plastic spool according to claim 6 in which the spool body inwardly of said rim ends has circumferentially extending recesses opening outwardly through end surfaces of the spool body.

8. A lightweight plastic thread spool comprising an inner tube, an outer barrel, said spool being substantially hollow intermediate said tube and barrel, end wall portions joining the tube and barrel, a flange at each end portion of the spool comprising an inner annular bevelled portion and an outer annular portion, a multiplicity of circumferentially spaced weight-reducing plastic-saving slots in the annular bevelled portion, said slots being substantially parallel to one another and each having a substantially triangular outline when viewed in side elevation, and a rib between each pair of neighboring slots.

9. A spool according to claim 8 in which some of said slots extend into the barrel of the spool adjacent the end portion thereof.

10. A spool according to claim 8 comprising an incompletely formed spool body having at least a portion of each said flange die cast thereon to form a complete spool.

11. A spool according to claim 8 in which said outer annular portion of each flange has a circumferentially extending groove therein, said groove being disposed adjacent said barrel and opening through said end portion of the spool.

12. A spool according to claim 8 in which said outer annular portion of each flange has an outwardly extending label-retaining flange.

13. A spool according to claim 8 in which each said flange is integral with said spool.

14. A spool according to claim 8 in which each said flange comprises two parts, one of said parts being integral with said barrel, and the other of said parts being mounted around said one part.

15. A spool according to claim 14 in which said barrel and integral flange part are made of lower quality, less expensive plastic than said other flange part.

16. In a die cast thread spool having a flange at each end, the improvement wherein each flange has a multiplicity of circumferentially spaced, narrow recesses opening through an external surface thereof, each pair of next adjacent recesses having a rib disposed therebetween so that said flange has substantially as many ribs as recesses, all of said ribs and recesses extending substantially parallel to one another, said ribs serving to support thread wound thereon, and said recesses serving to lighten the weight of said spool and to reduce the amount of material, otherwise required, of which said flange is made.

References Cited in the file of this patent

UNITED STATES PATENTS

| | | |
|---|---|---|
| 2,277,224 | Grauer | Mar. 24, 1942 |
| 2,683,572 | Morin | July 13, 1954 |

FOREIGN PATENTS

| | | |
|---|---|---|
| 265,489 | Switzerland | Sept. 16, 1950 |
| 2,079 | Great Britain | of 1854 |
| 235,297 | Great Britain | June 11, 1925 |
| 362,798 | Great Britain | Dec. 10, 1931 |

UNITED STATES PATENT OFFICE

CERTIFICATE OF CORRECTION

Patent No. 2,887,282　　　　　　　　　　　　　　　　　　　　May 19, 1959

Louis H. Morin

It is hereby certified that error appears in the printed specification of the above numbered patent requiring correction and that the said Letters Patent should read as corrected below.

Column 2, line 1, for "formed in each face of the spool" read -- formed in each end face of the spool --.

Signed and sealed this 22nd day of September 1959.

(SEAL)
Attest:

KARL H. AXLINE
Attesting Officer

ROBERT C. WATSON
Commissioner of Patents